(12) United States Patent
Barber

(10) Patent No.: US 9,542,363 B2
(45) Date of Patent: Jan. 10, 2017

(54) PROCESSING OF PAGE-IMAGE BASED DOCUMENT TO GENERATE A RE-TARGETED DOCUMENT FOR DIFFERENT DISPLAY DEVICES WHICH SUPPORT DIFFERENT TYPES OF USER INPUT METHODS

(71) Applicant: KONICA MINOLTA LABORATORY U.S.A., INC., San Mateo, CA (US)

(72) Inventor: Daniel Barber, Tustin, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 416 days.

(21) Appl. No.: 14/170,327

(22) Filed: Jan. 31, 2014

(65) Prior Publication Data

US 2015/0220490 A1    Aug. 6, 2015

(51) Int. Cl.
*G06F 17/21* (2006.01)
*G06F 17/22* (2006.01)

(52) U.S. Cl.
CPC ........... *G06F 17/212* (2013.01); *G06F 17/227* (2013.01); *G06F 17/2247* (2013.01)

(58) Field of Classification Search
USPC ................................................. 715/243–253
See application file for complete search history.

(56) References Cited

U.S. PATENT DOCUMENTS

| | | | |
|---|---|---|---|
| 2004/0205568 A1 | 10/2004 | Breuel et al. | |
| 2004/0268249 A1* | 12/2004 | Fennelly | G06F 17/30569 715/236 |
| 2005/0193327 A1* | 9/2005 | Chao | G06F 17/24 715/256 |
| 2006/0026511 A1* | 2/2006 | Rainero | H04L 65/602 715/248 |
| 2011/0289395 A1* | 11/2011 | Breuel | G06K 9/00463 715/205 |
| 2013/0191779 A1* | 7/2013 | Radakovitz | G06F 3/0488 715/800 |
| 2014/0368421 A1* | 12/2014 | Smus | G06F 3/038 345/156 |

FOREIGN PATENT DOCUMENTS

EP        1343095        9/2003

* cited by examiner

*Primary Examiner* — Stephen Hong
*Assistant Examiner* — Sanchita Roy
(74) *Attorney, Agent, or Firm* — Chen Yoshimura LLP

(57) ABSTRACT

Method and system for processing a page-image based input document such as PDF and generate output documents, in a page-image based format or another format, which have a different layout than the original document. Certain contents in the original document removed and other contents are reorganized in this process. The method is used to re-target documents for different types of display devices, such as desktop and laptop computers, tablet computers, e-readers, smart phones, etc. When generating the output documents, the method takes into consideration the different form factors of the display devices as well as the different types of user input devices and methods such as touch screen (including different gestures used, whether stylus or finger is used for input, etc.), physical keyboard, mouse, etc. used by the targeted display device, so that each output documents is optimized for a particular type of display device.

9 Claims, 9 Drawing Sheets

CAMERA ASSEMBLY

∧ Preventing Water Damage to Your Camera

The rubber seal that lines the camera housing forms a waterproof barrier that protects your HERO3 in wet and underwater conditions. Keep the camera housing's
rubber seal clean; a single hair or grain of sand can cause a leak.
After every use in salt water you will need to rinse the outside of the housing with non-salt water and dry. Not doing this can eventually cause corrosion of the
hinge pin and salt buildup in the seal, which can cause failure.
To clean the seal, rinse in fresh water and shake dry (drying with a cloth may cause lint to compromise the seal). Re-install the seal into the grooves in the backdoor of the housing.

WARNING: *Failure to follow these steps each time you use your HERO3 can result in leaks that may damage or destroy your camera. Your warranty does not cover water damage resulting from user error.*

∨ Attaching your camera to Mounts

∨ Using Curved or Flat Adhesive Mounts

Fig. 3C

CAMERA ASSEMBLY

∨ Preventing Water Damage to Your Camera

∧ Attaching your camera to Mounts

To attach your HERO3 camera to a mount, you will need an attachment buckle,
thumb screw or hardware depending on the mount you are using. For more
information on mounts, visit gopro.com/support.

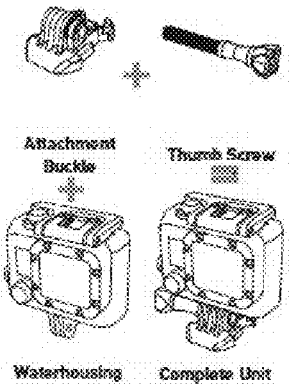

Attachment Buckle   Thumb Screw

Waterhousing   Complete Unit

∧ Using Curved or Flat Adhesive Mounts

The curved and flat adhesive mounts make it easy to attach the camera to curved
and flat surfaces of helmets, vehicles and gear. With the attachment buckle the
assembled camera housing can be clicked ON/OFF the secured adhesive mounts.

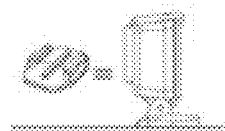

Flat Adhesive Mount

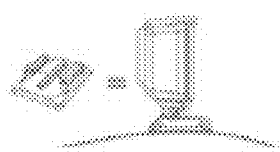

Curved Adhesive Mount

Fig. 3D

```
1.  <Document name="gopro camera assembly">
2.    <Pages>
3.      <Page number="1" markednumber="63">
4.      <Page number="2" markednumber="64">
5.    </Pages>
6.    <Content>
7.      <Element Id="..." type="PageHeader" pageParentNumber="1">
8.        <Element Id="..." type="SectionHeader" pageParentNumber="1">
9.          <Element Id="..." type="SectionText" pageParentNumber="1" />
10.       </Element>
11.       <Element Id="..." type="PageNumber" pageParentNumber=1" />
12.     </Element>
13.     <Element Id="..." type="PageHeader" pageParentNumber="2">
14.       <Element Id="..." type="SectionHeader" pageParentNumber="2">
15.         <Element Id="..." type="SectionText" pageParentNumber="2">
16.           <Element Id="..." type="ImageWithAnnotation" pageparentnumber="2" />
17.           <Element Id="..." type="ImageWithAnnotation" pageparentnumber="2" />
18.           <Element Id="..." type="ImageWithAnnotation" pageparentnumber="2" />
19.           <Element Id="..." type="ImageWithAnnotation" pageparentnumber="2" />
20.         </Element>
21.       </Element>
22.     </Element>
23.     <Element Id="..." type="SectionHeader" pageParentNumber="2">
24.       <Element Id="..." type="SectionText" pageParentNumber="2" >
25.         <Element Id="..." type="ImageWithAnnotation" pageparentnumber="2" />
26.         <Element Id="..." type="ImageWithAnnotation" pageparentnumber="2" />
27.       </Element>
28.     </Element>
29.     <Element Id="..." type="PageNumber" pageparentnumber="2" />
30.   </Content>
31. </Document>
```

Fig. 4

| | Page Number | Page Header | Author | Section Headers | Tables | Text under Section Header | Text without Section Header | Images in text block | Images not in text block | Character Spacing and/or word spacing |
|---|---|---|---|---|---|---|---|---|---|---|
| Desktop or laptop computer | Keep original | Keep Original | Keep Original | Keep Original | Keep Original | Keep Original | Keep Original | Keep Original | Keep Original | Keep Original |
| iPhone™ (High resolution, finger multitouch) | Remove | Remove | Remove | Keep Original | Collapse / Split | Collapse / Split | Keep Original | Move to section Top, resize to device width | Move to Center Bottom of section header | Increase 20% |
| Kindle™ (Keyboard) | Move to center bottom | Remove | Move to center top | Remove | Split at page level | Keep Original | Keep Original | Resize, Center | Display as own page | Keep Original |
| Samsung™ Galaxy™ Note (High resolution, stylus) | Move to center bottom | Move to Center Top | Move to center top | Keep Original | Split at page level | Collapse / Split | Collapse / Split | Resize, Tile at text block level, Center | Display as own page | Increase 10% |
| Blackberry Bold 9900 (Low resolution, keyboard / finger) | Remove | Remove | Remove | Keep Original | Collapse / Split | Collapse / Split | Keep Original | Move to section Top, resize to device width | Move to Center Bottom of section header | Increase 20% |

Fig. 5

PROCESSING OF PAGE-IMAGE BASED DOCUMENT TO GENERATE A RE-TARGETED DOCUMENT FOR DIFFERENT DISPLAY DEVICES WHICH SUPPORT DIFFERENT TYPES OF USER INPUT METHODS

BACKGROUND OF THE INVENTION

Field of the Invention

This invention relates to document processing, and in particular, it relates to processing a page-image based document and re-targeting it for display on different devices.

Description of Related Art

Methods have been developed to convert a page-image based document, such as a PDF (portable data format) document generated by scanning a printed document, to a form suitable for reformatting and displaying on desired electronic display devices. For example, US Pat. Appl. Pub. No. 2011/0289395 describes a method that "converts a document originating in a page-image format into a form suitable for an arbitrarily sized display, by reformatting or 're-flowing' of the document to fit an arbitrarily sized display device. A two-stage system analyzes, or 'deconstructs,' page image layout. The deconstruction includes both physical (geometric) and logical (functional) segmentation of page images. The segment that image elements may include blocks, lines, and/or words of text, and other segmented image elements. The segment that image elements are synthesized and converted into an intermediate structure. The intermediate data structure is then distilled or converted or redisplayed into any number of standard print formats." (Abstract.) FIG. 1 of this patent shows an example of an intermediate data structure (XHTML in this case) for a page image. "Reflowing is a process that moves text elements (often words) from one text-line to another so that each line of text can be contained within given margins. Reflowing typically breaks or fills lines of text with words, and may re-justify column margins, so that the full width of a display is used and no manual 'panning' across the text is needed." (Id., para. [0009].)

When presenting contents of webpages, it is common to change the style of the presentation when the content is to be displayed on different types of electronic display devices or printed out. For example, web pages are often presented differently for on-screen display vs. printing, and for display on laptop or desktop computers vs. mobile devices such as tablet computers or smart phones. In some examples, when a webpage is printed, various navigation tools and links, background images, etc. that are presented for on-screen display are not presented in the printed format. In other examples, when a webpage is displayed on a mobile device as opposed to a laptop or desktop computer, the width (e.g., number of characters per line) typically becomes narrow, positions of images are often moved (e.g. an image presented on one side of the page are often moved to the center), navigation tools are often hidden or removed, sections of text may be made collapsible/expandable into the section header, etc. These changes can be accomplished by using style sheets, such as Cascading Style Sheets (CSS). Using this approach, the document itself is not re-written; rather, different style sheets are applied to it to create different presentations for different devices.

SUMMARY

The present invention is directed to a method and related apparatus for automatically processing a page-image based document to re-target it for different desired display devices. The output document generated by this process can be another page-image based document, or a document of other formats, suitable for desired display devices.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing an input document to generate a plurality of output documents, including: (a) constructing a hierarchical data structure from the input document, the hierarchical data structure including a plurality of content elements detected from the input document and placed in a hierarchical structure; (b) storing a plurality of content removal and reorganization rules each corresponding to a type of display devices, including at least two different rules corresponding to two types of display devices which support different user input methods; (c) generating a plurality of output documents based on the hierarchical data structure by respectively applying the plurality of content removal and reorganization rules, wherein each output document is generated by removing a subset of the content elements and rearranging remaining content elements according to the respective rule.

In the above method, the at least two different rules may include a first rule corresponding to a first type of display devices which supports a first type of touch screen that is capable of detecting a position where a user touches it with a finger, a second rule corresponding to a second type of display devices which supports a second type of touch screen that is capable of detecting a position where a user touches it with a stylus pen, and a third rule corresponding to a third type of display device which supports hardware keys. The rearranging may include increasing a character spacing and/or word spacing of the text.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 3A-3E show an example of an input document being converted to a re-targeted output document using the method of FIGS. 1 and 2. FIGS. 3A and 3B show two pages of the input document with detected elements labeled for illustration purpose; FIG. 3C shows a first output document with the first section expanded and other sections collapsed;

FIG. 3D shows the first output document with the first section collapsed and the second and third sections expanded; and FIG. 3E shows two pages of a second output document which is in a page-image format.

FIG. 4 shows an example of a hierarchical data structure for the example shown in FIGS. 3A and 3B, generated by the method of FIGS. 1 and 2.

FIG. 5 shows an examples of content removal and reorganization rules used when generating an output document based on a hierarchical data structure.

DETAILED DESCRIPTION OF PREFERRED EMBODIMENTS

Embodiments of the present invention provide a method and system to process a page-image based input document such as PDF and generate an output document, which may have a page-image based format or another format, which has a different layout than the original document. Certain contents in the original document removed and other contents are reorganized in this process. The method is used to re-target documents for different types of display devices, such as desktop and laptop computers, tablet computers, e-readers, smart phones, etc. When generating the output document, the method takes into consideration the different form factors of the display devices as well as the different types of user input methods such as touch screen (including different gestures used, whether stylus or finger is used for input, etc.), physical keyboard, mouse, etc. used by the targeted display device.

According to embodiments of the present invention, a page-image based input document is first converted to a hierarchical data structure in a parsable format, whereby the content of the document is segmented into multiple elements which are represented in the hierarchical data structure as various elements forming a hierarchical structure. Using the hierarchical data structure, the elements of the content are re-arranged to generate a new document (an output document) which is targeted to a specific device or type of devices with specific layout requirements. The output document can have any of a variety of formats. In one embodiment, the output document is in a page-image based format and has a defined layout that does not rely on a style sheet for presentation. One advantage of this approach is that it is useful for generating re-targeted documents that can be viewed on devices, such as some e-readers, that do not use style sheets.

Figure 3A:
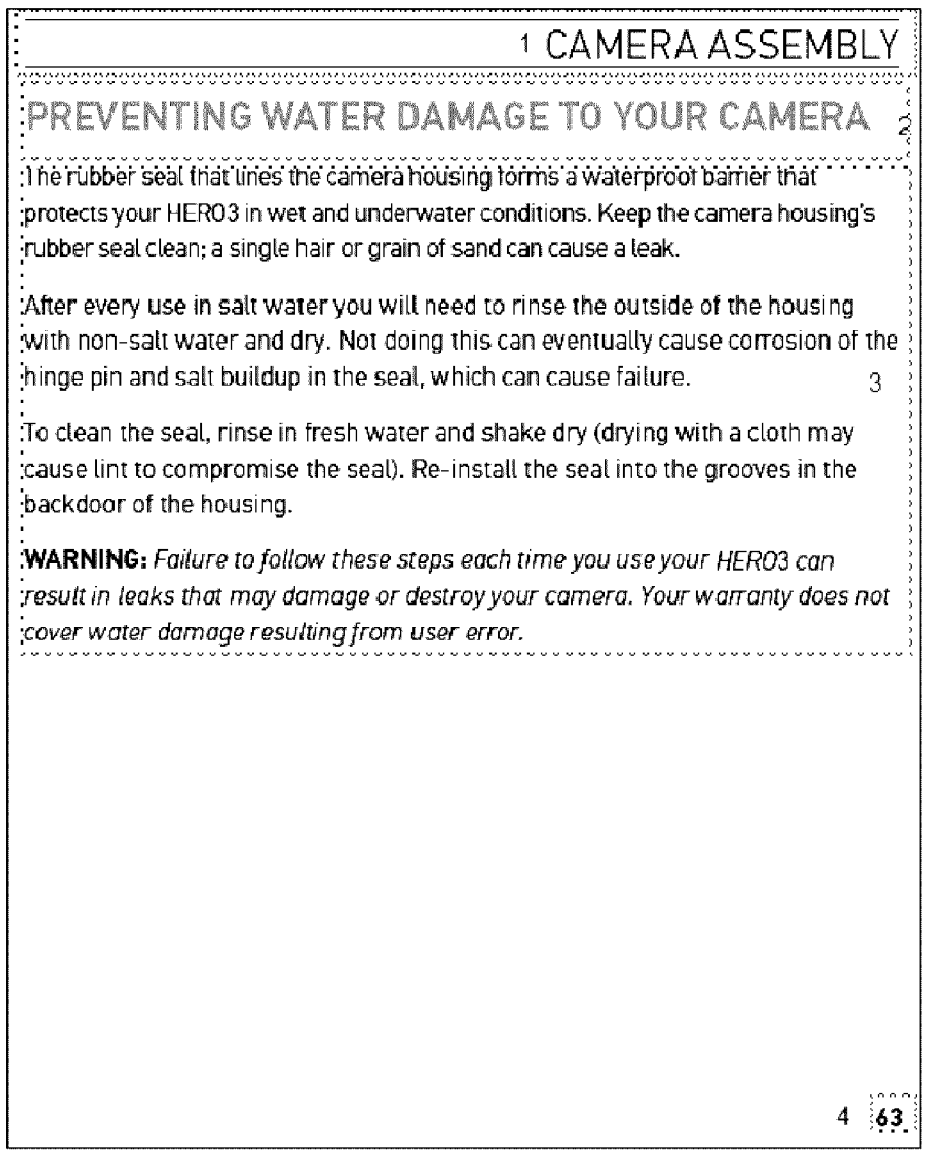
Figure 3B:
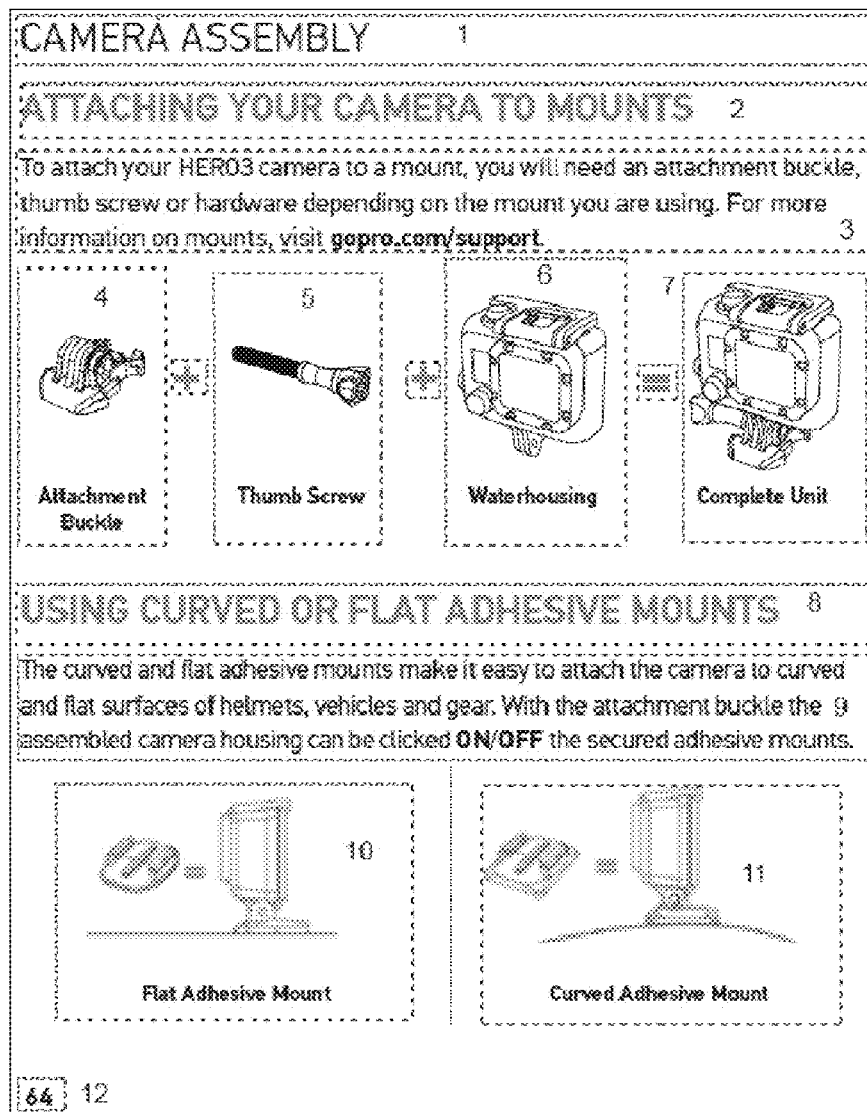
Figure 3E:
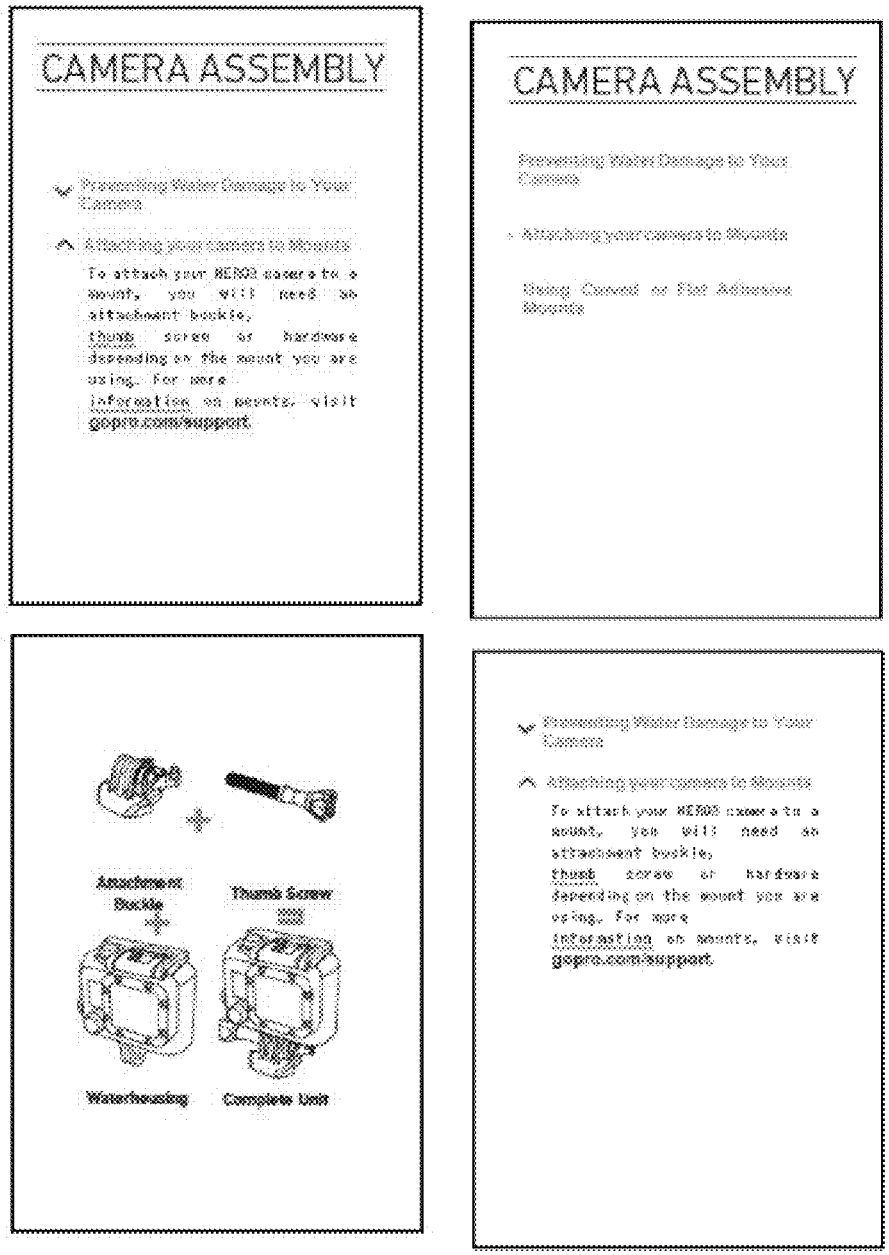

A method for processing an input document and generating a re-targeted output document according to an embodiment of the present invention is described below with reference to FIG. 1. First, the input document is analyzed to detect content elements in it (step S11). The input document is in a page-image based format such as PDF, which may have been generated by scanning a hardcopy document. Content elements of the document include, for example, text, image (including graphics), combinations of text and image, etc. FIGS. 3A and 3B show two pages of an exemplary input document with content elements indicated by dashed-line boxes and labeled for illustration purpose. The page shown in FIG. 3A has elements 1 to 4, and the page shown in FIG. 3B has elements 1 to 12.

After detection of elements in the document, the type of each element is classified (step S12). Exemplary element types include page number, page header, section header, section text, image, image with annotation, etc. For example, the types of the various elements in the two exemplary pages shown in FIGS. 3A and 3B are indicated in the insert box in the figures. Various algorithms can be used to classify the element type. For example, the same text of the same style that appears at the top of multiple consecutive pages may be classified as a page header; a certain style of text that occurs repeatedly with other content in between may be headers; short text strings located at certain locations of pages (e.g., a corner, or top or bottom center) may be page numbers, etc.

A hierarchical data structure of the document is constructed from the detected elements by placing each element in a proper position of the document hierarchy according to the element's type and location on the pages (step S13). In the hierarchical data structure of the document, each element is a child of a page, and each page is a child of the document. Many construction rules can be used to correctly place elements in the document hierarchy. For example, a page header is a parent of all elements on that page (and page headers may be the same from page to page); a section header may have many different child elements that may span multiple pages; text blocks may contain images and tables and other elements, etc. Some exemplary rules are outlined below:

(1) If a header type element appears in multiple consecutive pages but has the same text value, then the elements on these pages are children of the same header.

(2) If a header type element is detected, then elements after it are its children until another header of the same type and a different text value is detected.

(3) If a text type element has tables below it, or images in, beside, or below it, or list type or other elements indented beneath it, these elements are children of the text element.

(4) Header type elements (section header, sub-header, etc.) break elements of all leaf types (text, list, image groups).

The rules outlined above are merely examples; many other rules can be used in actual implementation. In addition, different rules may be used for different types or classifications of documents based on their content or professional fields of use or publication requirements. For example, documents for publication in medical journals, law journals, text books, or novels, etc. may have different rules about how footnotes are treated. The classification of documents can be set when the document is entered into the data processing system.

Figure 2:
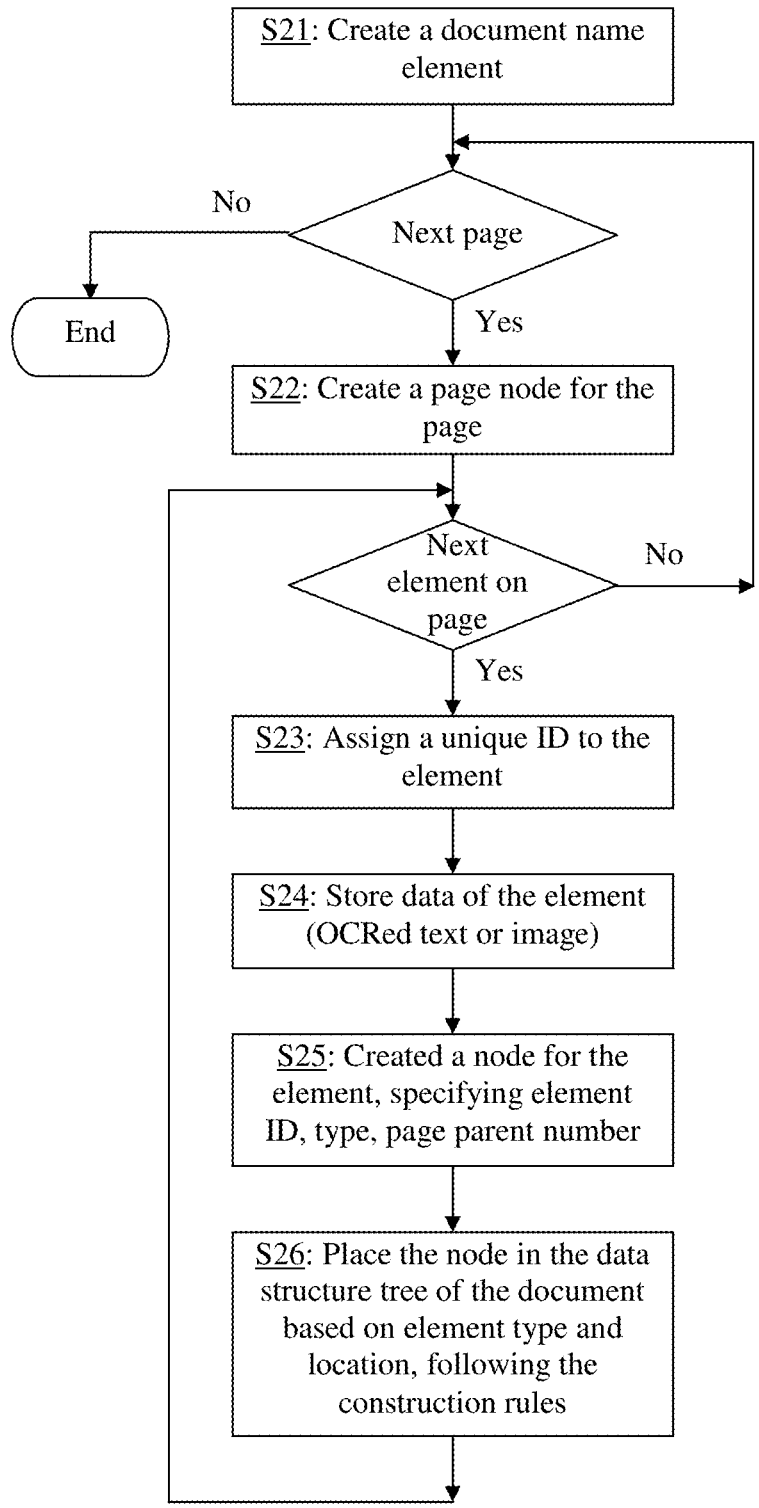
FIG. 2 schematically illustrates a process for constructing a hierarchical data structure for the input document according to an embodiment of the present invention.

An example of a process of constructing the hierarchical data structure for the document (step S13) is illustrated in FIG. 2. The description uses xml as an example of the data structure, but other formats may be used. The process starts from the first page of the document and processes each page in turn. First, the process starts creating the document structure by creating a document name element (step S21). Then, a new page node is created, with both a page number (the page number for purpose of the hierarchical data structure) and a marked number (the page number value as present on the input document) as attributes (step S22).

The process treats each element on the page, starting from a defined location such as the top left. Each element is assigned a unique element identification number (uniqueId) (step S23). Each element also has a type as classified in the classification step (S12), and has a page parent number which is the page number of the page that the element is on.

The data of the element is stored in memory (step S24), e.g., in a database, as follows: If the element is text based, parse the text using OCR and note its stylistic data (including layout), and store the text value and stylistic data; if it is image based, capture the image (and OCR the annotation, if present) and note its stylistic data (including layout), and store the image and stylistic data.

Then, a node of the hierarchical data structure is created for the element (step S25). The node specifies the unique ID, the type, and the page parent number of the element. Based on the type of the element and its location on the pages, and following the construction rules described above, the element's node is placed in the hierarchical data structure tree of the document (step S26). The process is repeated for the next element on the page until all elements are processed, and then repeated for the next page until all pages are processed.

Note that the process shown in FIG. 2 is only an example; any other suitable method may be used to construct a hierarchical data structure for the document.

Multi-page spanning elements may require an additional combining step. Because elements are detected at page level in step S11, elements present on multiple consecutive pages may in fact be the same content element, and can be combined to form a single element that spans multiple pages. For example, a text block that spans multiple pages can be combined to form one text element. This combining step takes into consideration the presence of repetitive page-level elements such as page header, page number, etc.; for example, two text elements separated by a page number element may be combined. In the hierarchical data structure, an element of the document has no concept of page other than an attribute item (pageParentNumber) pointing back to the page registration list; thus, an element can span multiple pages, and its registered position is where the element starts. Note that in this format, a parent element may have a pageParentNumber of a lesser value than its children. The combining step is performed before the construction step S13.

FIG. 4 illustrates an example of a hierarchical data structure for the two pages of document shown in FIGS. 3A and 3B constructed by the above process (FIG. 2). In this example, the hierarchical data structure is an xml document, but other parsable format or language may be used.

Referring back to FIG. 1, once the hierarchical data structure is constructed and the data of the element including OCRed text is stored, an output document can be generated from the hierarchical data structure, with desired formatting and layout that target a specific type of display devices (step S14). The output document can be in one of a number of formats, such as PDF, html, etc. Step S14 can be repeated multiple times as desired to generate multiple output documents each targeting a different type of display device. The documents can be stored on a server computer, and transmitted to users' devices upon request, for example, when a user downloads a document from the server.

This process provides a proper, hierarchy sensitive, layout sensitive re-targeting of documents to different screen sizes and formats. In one example, the output document is targeted for an iPhone™ (e.g. iPhone 4 or 5) or a similar smart phone device, which typically has a screen of about 2 to 2.5 inches wide and uses a swiping gesture on a touch screen to scroll vertically or horizontally. The output document targeted for this type of devices is generated to have the following layout features: It has a narrow width suitable for the width of the display screen (e.g., 40-50 characters per line); page numbers and repeating page header is removed; the images are floated and moved respective to their content but respecting their parents; text under a section header is collapsed into the header; etc. By using a narrow width, the user will only need to scroll vertically, but not horizontally, to see the full content.

FIGS. 3C and 3D illustrate an example of an output document generated from the hierarchical data structure in FIG. 4 for the sample image shown in FIGS. 3A and 3B, in a continuously scrolling format suitable for a smart phone device. In this particular example the output document is in an html format. In the example of FIG. 3C, the first section ("Preventing . . . ") is expanded and other sections collapsed; FIG. 3D shows the same output document, but the first section is collapsed and the second ("Attaching . . . ") and third ("Using . . . ") sections are expanded. The output document contains navigation tools that allow the user to expand and collapse the sections.

If the output document is a PDF format targeted for a smart phone type display device, the PDF document can be generated to have a layout similar to that shown in FIGS. 3C and 3D in terms of the width and the placement of content, but the sections will all be expanded and not collapsible. Further, the PDF document will have pages, instead of being a continuously scrolling document. In addition, a navigable table of content can be created based on its detection of section headers in the document and can be placed at the top of the PDF document. FIG. 3F shows some exemplary pages of such a PDF output document.

The output document can also be a text-only format, where all images in the input document are removed. Another output document format is one in which all the images are placed in a collection at the end of the document, with pointers or links in the text portion of the document that points or link to the images.

The intelligent removal of duplicate page content such as page headers and page number is an important aspect when generating the output document (step S14). For example, if the targeted display device has a larger screen size than the original input document such that content of multiple pages of the input document can fit on one screen, not removing these duplicate page contents would result in a page having unnecessary and wasteful repeats of useless data or text. Furthermore, if the intended output format is HTML or an e-book format other than PDF, page-level data (such as page numbers) would be useless, as these formats are pageless in nature. Having page level data on a pageless device is useless, as well as confusing.

In addition to page level content discussed above, certain other content may also be removed, including some document level content, section level content, etc. The choices regarding what content is to be removed typically depend on considerations such as ease of use, readability, etc. when the content is presented on the particular devices for which it is intended.

Therefore, in addition to rearranging various content elements, step S14 may include removal of page-level content and other content depending on the output layout and format requirements. In embodiments of the present invention, different content removal and reorganization rules are used in the document generation process (step S14) depending on the target devices and file formats. These rules are created beforehand, stored in the system (as indicated by database D15 in FIG. 1) and provided to step S14 when generating the output document. Some examples of content removal and reorganization rules are summarized in a table shown in FIG. 5. Each row in the table corresponds to a targeted display device; each column indicates a specific content treatment rule. The collections of all individual rules for each device may be referred to as a rule corresponding to the respective device. Both the devices and the individual rules shown in this table are only examples; different rules may be adopted in actual implementation, and rules for other types of devices may be added. In the examples shown in FIG. 5, the targeted devices have the following characteristics which influence the design of the content removal and reorganization rules:

iPhone™ (e.g., iPhone™ 4 or 5): Screen width: about 2.3 inches; high resolution; scrolling mode: finger gesture, horizontal and vertical scrolling; multitouch; pinch zooming.

Kindle™ (e.g. Fire™ and Fire™ HDX): screen size: 8.9 inches; multi-touchscreen; high resolution; horizontal and vertical scrolling; pinch Zooming.

Samsung™ Galaxy™ Note™ (original model): screen size: 5.3 inches; multi-touchscreen; high resolution; horizontal and vertical scrolling; pinch zooming.

Blackberry™ Bold™ 9900: screen size: 2.8 inches; low resolution screen; touch screen; keyboard, scrollwheel; button based zooming and selecting.

Generally speaking, the following device characteristics will influence the design of the content removal and reorganization rules: screen size (physical width and height), screen resolution (in pixels), user input devices (such as finger, stylus, hardware keyboard, scroll wheel, etc., which will drive the way users scroll through data and select data), user input behaviors (such as vertical drag scrolling, horizontal drag scrolling, horizontal page flipping, etc.), device connectivity and bandwidth, etc. Some general considerations for designing content removal and reorganization rules based on device characteristics are described below.

(1) Whether an image will be sent to a particular device may be determined based on the device's connection bandwidth, resolution, and screen size.

(2) Devices with aspect ratios that are less square (e.g., 3:2 and 16:9 in the first to fourth generation, and fifth generation iPhones, respectively) are more suitable for content to be displayed in an inline fashion, meaning that block-level elements take up the width of the screen, and all elements are pushed "down", resulting in scrolling in only one direction.

(3) Small form factor devices will use single scroll direction as a major design rule, as it greatly increases usability on these devices that use scrolling as a primary mechanism to display addition content.

(4) On devices that have a larger form factor and use page flipping to display additional content, such as the Kindle Fire (e.g. Fire HD, Fire HDX) and some other tablet devices running book reading applications, the content removal and reorganization rules should be designed to make the user experience involve as little user work as possible. Thus, for example, the amount of content (text) for each page is such that the text can be display without zooming (and therefore scrolling). Because these are page based devices (or apps), the content should be made borderless and include very little wasted space, and page headers and other page content should be shrunk or removed. In addition, because these devices support touch image zooming, the images can be kept in their original position and size, allowing the users to take advantage of the zooming functionality of the devices; at the same time, care should be taken to place the images on the page in such a manner that they do not interfere with the page-flipping functionality or cause user confusion between changing page and image zooming.

(5) On devices that do not use touch screen input (e.g. Kindle original model), maximum screen area can be used for display without concern of touch-input zones. Thus, a much closer match to the original document can be maintained in page layout and design.

(6) Character spacing (spaces between characters within words) and/or word spacing (spaces between words) of paragraph text can be made to depend on whether fingers or a stylus is used as the input method. For devices that use fingers as the input method and have relatively small but high resolutions display screens (e.g. the iPhone 4 and 5 and the Google nexus 5), the displayed text characters are typically much smaller than the fingertip. For such devices, character spacing and/or word spacing for the displayed text can be made relatively large, e.g., increased by 20% from that in the original PDF (or from the character spacing normally used for desktop or laptop display). This can make selecting text easier as well as increase legibility. On devices with stylus input and small to midsize, high resolution displays (e.g. the Samsung galaxy note 3), the character spacing and/or word spacing can be smaller than the above-mentioned devices that use fingers as primary input device, but still increased from the spacing in the original PDF, e.g., by 10%. On devices with lower resolution displays, or devices with larger screens such as tablets or e-readers, good legibility can be achieved without increasing the character spacing as compared to the original PDF or the display on a desktop or laptop display. For devices without input via finger or touchscreen, such as a desktop or laptop computer, conventional spacing values can be used, and there is no need to modify them to increase input accuracy. Some phones, such as the Blackberry™ bold line (9900 for example) have scrollwheel/scrollball style mousing and selecting as well as touchscreens; on these devices, there is no need to take character and word spacing into account for purpose of input and selecting, but character and word spacing can still be taken into account for readability.

As new devices become available, content removal and reorganization rules may be developed for them, by studying the device characteristics and following the above-described design considerations. In other words, the content removal and reorganization rule table stored in database D15 is updated to target new devices. An intermediary rules language may be provided so that rules are easily creatable by humans as well as parsed by the system. For example, an interface may be designed to allow a user to enter values into a form, and rules can be generated by the computer from the entered values.

As mentioned earlier, in the process shown in FIG. 1, from one input document, multiple output documents can be generated targeting different devices or device types. If any of the content removal and reorganization rules are changed, new output documents can be generated using the changed rules and stored on the server.

Figure 6:
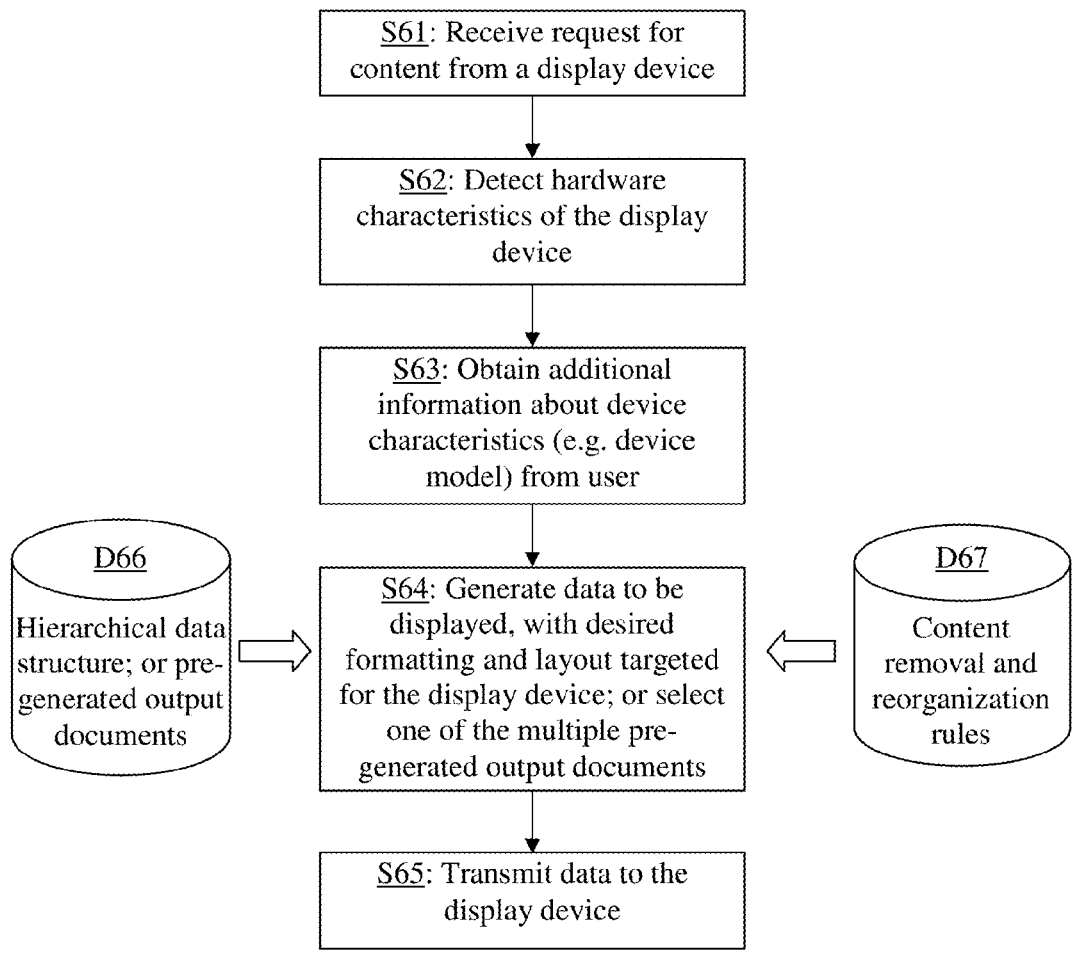
FIG. 6 schematically illustrates a process for generating data for display on a targeted display device according to another embodiment of the present invention.
Figure 7:
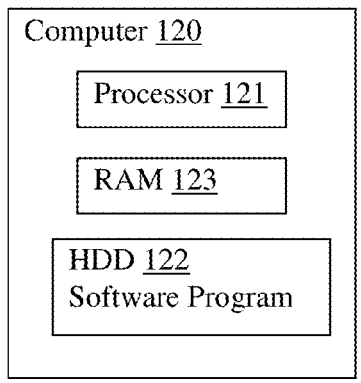
FIG. 7 schematically illustrates a data processing apparatus in which embodiments of the present invention may be implemented.

FIG. 6 schematically illustrates a process for generating data for display on a targeted display device according to another embodiment of the present invention. While the process shown in FIG. 1 generates an output document that can be stored on a server computer and ready to be downloaded, the process shown in FIG. 6 generates suitable data for a targeted device on the fly, using hierarchical data structures of contents which have already been constructed, for example by a process similar to steps S11-S13 of FIG. 1.

In step S61, the server receives a request for content from a display device. The request may correspond to a device accessing a web page, downloading a document from a web server, etc. The server detects hardware characteristics of the display device making the request (step S62). For example, the server is typically able to detect whether the requesting device is a mobile device (tablet computers, mobile phones, e-reader devices, etc.) or a desktop or laptop computer. The server can also detect what browser is used by the device and the device's screen resolution. Sometimes the server can detect the input methods used by the device. Using combinations of these detected parameters, the server can often identify the exact model of the requesting device. Such detecting technology is known; any suitable detection method may be used in step S62. Optionally, the server queries the device's user to obtain additional information about the device and/or about the application that the user is using or will use to view the content (step S63). This step is useful because the server often cannot automatically detect certain information, for example what software the device has installed (e.g., a proprietary reader application) or what files are on the device.

Then, based on the hierarchical data structures of the requested content (stored in database D66), and using the pre-stored content removal and reorganization rules (D67), the server generates the data to be displayed, with desired formatting and layout targeted for the display device (step S64). The content removal and reorganization rules (D67), similar to the rules D15 in the embodiment of FIG. 1, are generated in the manner described above and stored on the server. The data is then transmitted to the display device (step S65).

Figure 1:
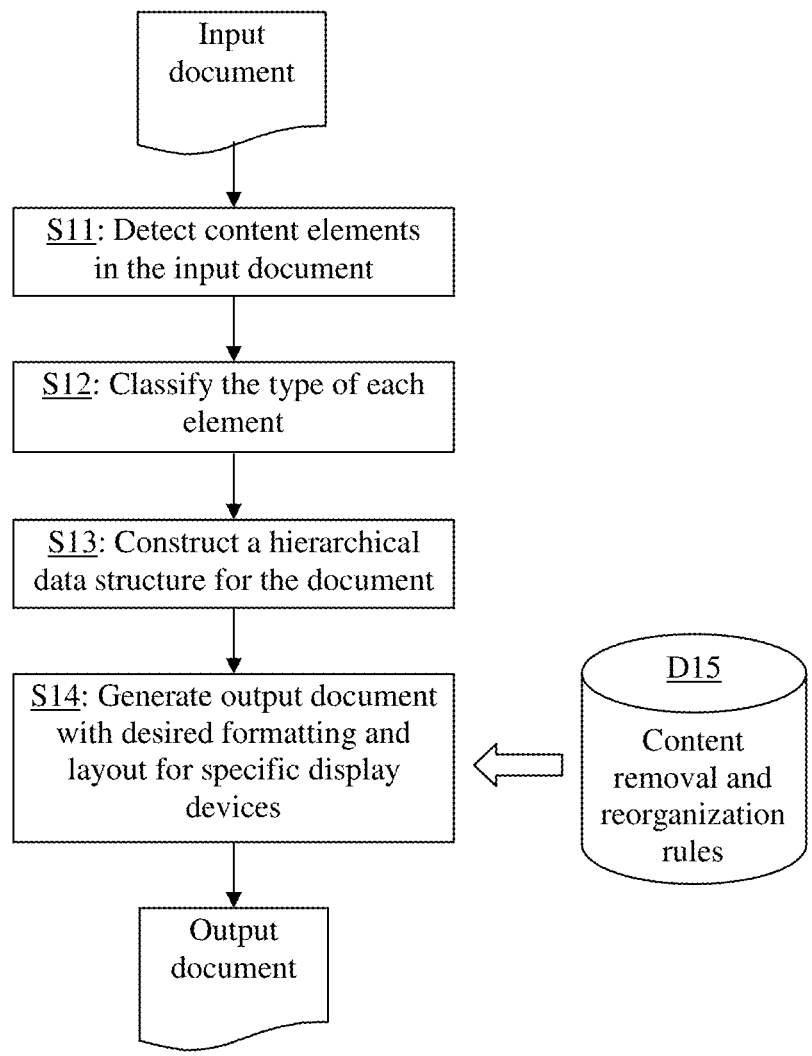
FIG. 1 schematically illustrates a process for processing a page-image based input document to convert it to an output document suitable for display on a desired device according to an embodiment of the present invention.

The method shown in FIG. 6 can also be used in a process flow where multiple output documents targeted for different types of display devices have already been generated by the process of FIG. 1 and stored on the server. In such a case, in step S64, instead of generating the data to be displayed, one of the multiple stored output documents is selected based on the information about the display device obtained in steps S62 and S63. Also, instead of the hierarchical data structures, the database D66 will store the multiple pre-generated output documents.

The document processing methods described here can be implemented in a data processing system such as a server computer 120 as shown in FIG. 6. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods. The display device is connected to the server computer via a network such as the Internet, by wired or wireless means.

In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the document processing method and related apparatus of the present invention without departing from the spirit or scope of the invention. Thus, it is intended that the present invention cover modifications and variations that come within the scope of the appended claims and their equivalents.

What is claimed is:

1. A method for processing an input document to generate a plurality of output documents, comprising:
   (a) constructing a hierarchical data structure from the input document, the hierarchical data structure including a plurality of content elements detected from the input document and placed in a hierarchical structure;
   (b) storing a plurality of content removal and reorganization rules, each rule corresponding to a type of display device, the rules including:
      a first rule corresponding to a first type of display device which supports a first type of touch screen that is capable of detecting a position where a user touches the touch screen with a finger, a second rule corresponding to a second type of display device which supports a second type of touch screen that is capable of detecting a position where a user touches the touch screen with a stylus pen, and a third rule corresponding to a third type of display device which supports hardware keys, the first, second and third rules being different from each other; and
   (c) generating and storing a plurality of output documents based on the hierarchical data structure and according to one of the plurality of rules, wherein each output document of the plurality of output documents is generated by removing a subset of the content elements and rearranging remaining content elements based on applying a content removal and reorganization rule corresponding to a particular type of display device;
   wherein the rearranging includes:
      increasing a character spacing or a word spacing or both from their respective values in the input document by a first amount when the first rule is applied, increasing the character spacing or the word spacing or both from their respective values in the input document by a second amount when the second rule is applied, and maintaining the character spacing and the word spacing of the input document when the third rule is applied, wherein the first and second amounts are different from each other.

2. The method of claim 1, wherein the input document is a PDF document, and each of the output documents is a PDF document.

3. A method implemented on a server computer for generating data to be displayed on a display device connected to the server via a network, the method comprising:
   (a) constructing a hierarchical data structure from the input document, the hierarchical data structure including a plurality of content elements detected from the input document and placed in a hierarchical structure;
   (b) storing the hierarchical data structure including a plurality of content elements in a hierarchical structure;
   (c) storing a plurality of content removal and reorganization rules, each rule corresponding to a type of display device, the rules including:
      a first rule corresponding to a first type of display device which supports a first type of touch screen that is capable of detecting a position where a user touches the touch screen with a finger, a second rule corresponding to a second type of display device which supports a second type of touch screen that is capable of detecting a position where a user touches 4 the touch screen with a stylus pen, and a third rule corresponding to a third type of display device which supports hardware keys, the first, second and third rules being different from each other;
   (d) receiving a request for content from the display device;

(e) determining a device type of the display device;
(f) generating display data for an output document, based on hierarchical data structure for the requested content by applying a selected one of the content removal and reorganization rules which correspond to the device type determined in step (d), including removing a subset of the content elements and rearranging remaining content elements according to the rule, wherein the rearranging includes:
increasing a character spacing or a word spacing or both from their respective values in the input document by a first amount when the first rule is applied, increasing the character spacing or the word spacing or both from their respective values in the input document by a second amount when the second rule is applied, and maintaining the character spacing and the word spacing of the input document when the third rule is applied; and
(g) transmitting the display data to the display device.

4. The method of claim 3, wherein the input document is a PDF document, and the output document is a PDF document.

5. A computer program product comprising a computer usable non-transitory medium having a computer readable program code embedded therein for controlling a data processing apparatus, the computer readable program code configured to cause the data processing apparatus to execute a process for generating data to be displayed on a display device connected to the server via a network, the process comprising:
(a) constructing a hierarchical data structure from the input document, the hierarchical data structure including a plurality of content elements detected from the input document and placed in a hierarchical structure;
(b) storing the hierarchical data structure including a plurality of content elements in a hierarchical structure;
(c) storing a plurality of content removal and reorganization rules, each rule corresponding to a type of display device, the rules including:
a first rule corresponding to a first type of display device which supports a first type of touch screen that is capable of detecting a position where a user touches the touch screen with a finger, a second rule corresponding to a second type of display device which supports a second type of touch screen that is capable of detecting a position where a user touches the touch screen with a stylus pen, and a third rule corresponding to a third type of display device which supports hardware keys, the first, second and third rules being different from each other;
(d) receiving a request for content from the display device;
(e) determining a device type of the display device;
(f) generating display data for an output document, based on hierarchical data structure for the requested content by applying a selected one of the content removal and reorganization rules which correspond to the device type determined in step (d), including removing a subset of the content elements and rearranging remaining content elements according to the rule, wherein the rearranging includes:
increasing a character spacing or a word spacing or both from their respective values in the input document by a first amount when the first rule is applied, increasing the character spacing or the word spacing or both from their respective values in the input document by a second amount when the second rule is applied, and maintaining the character spacing and the word spacing of the input document when the third rule is applied; and
(g) transmitting the display data to the display device.

6. The computer program product of claim 5, wherein the input document is a PDF document, and the output document is a PDF document.

7. The method of claim 1, wherein in step (a), each content element includes a page parent number.

8. The method of claim 3, wherein in step (a), each content element includes a page parent number.

9. The computer program product of claim 5, wherein in step (a) of the process, each content element includes a page parent number.

\* \* \* \* \*